W. W. RHAME & S. H. NUCKOLLS.
INDICATING CLOCK.
APPLICATION FILED APR. 25, 1910.
989,290.
Patented Apr. 11, 1911.
3 SHEETS—SHEET 1.
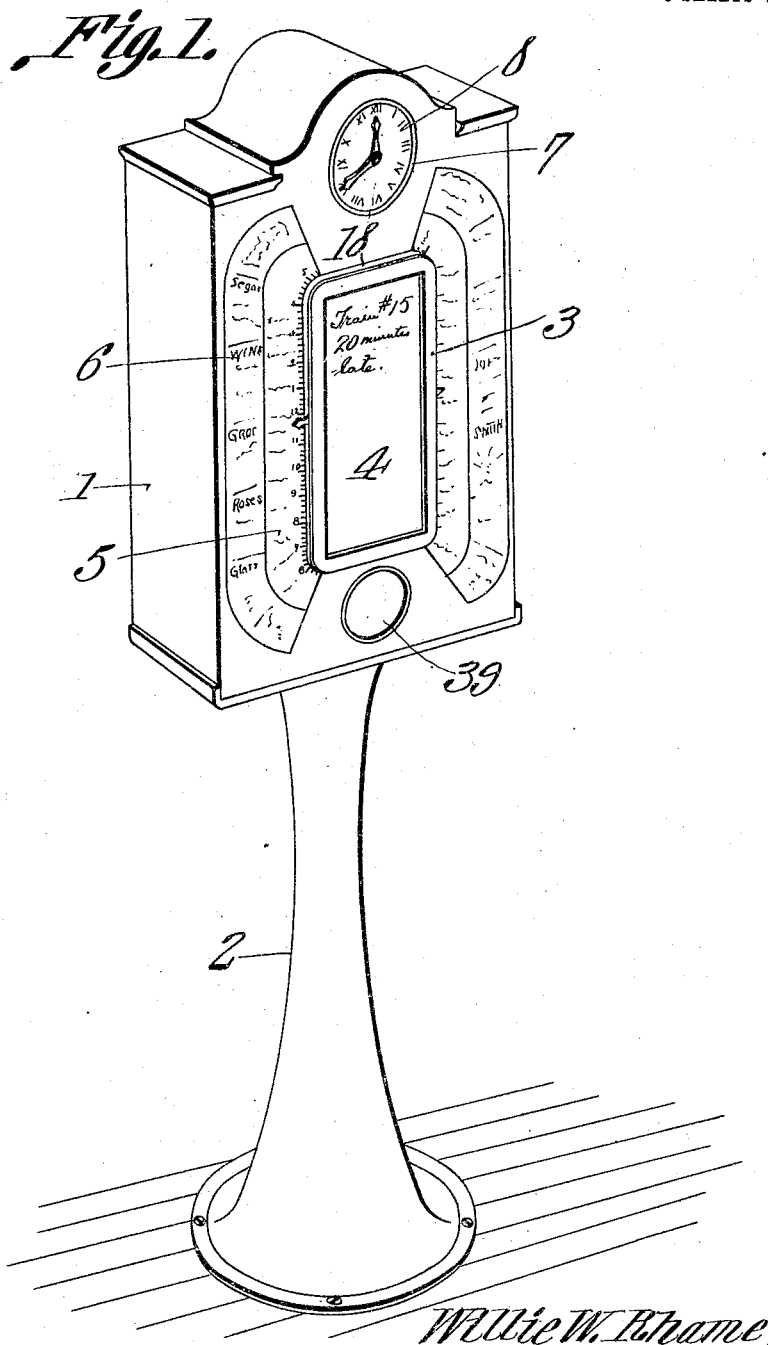

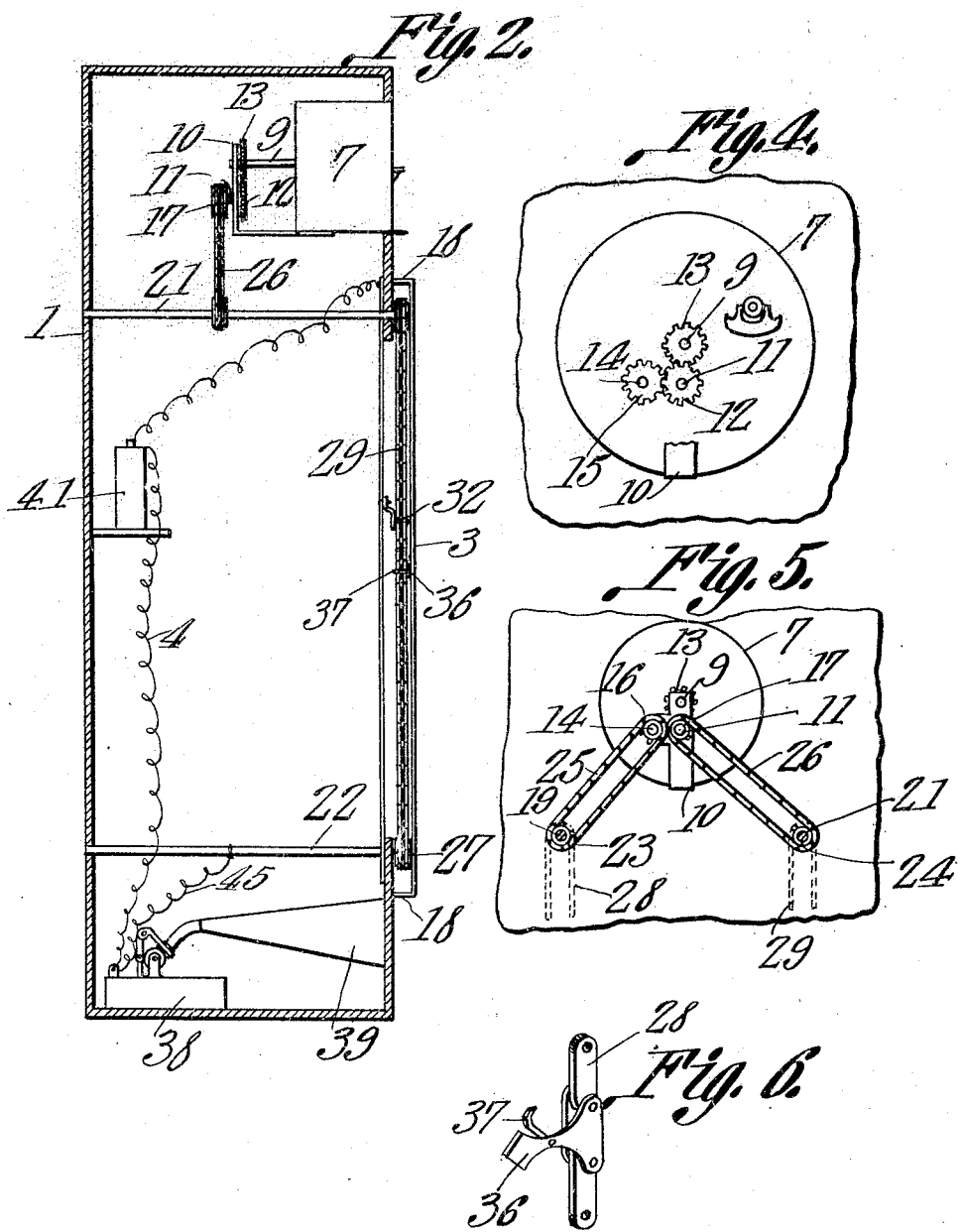

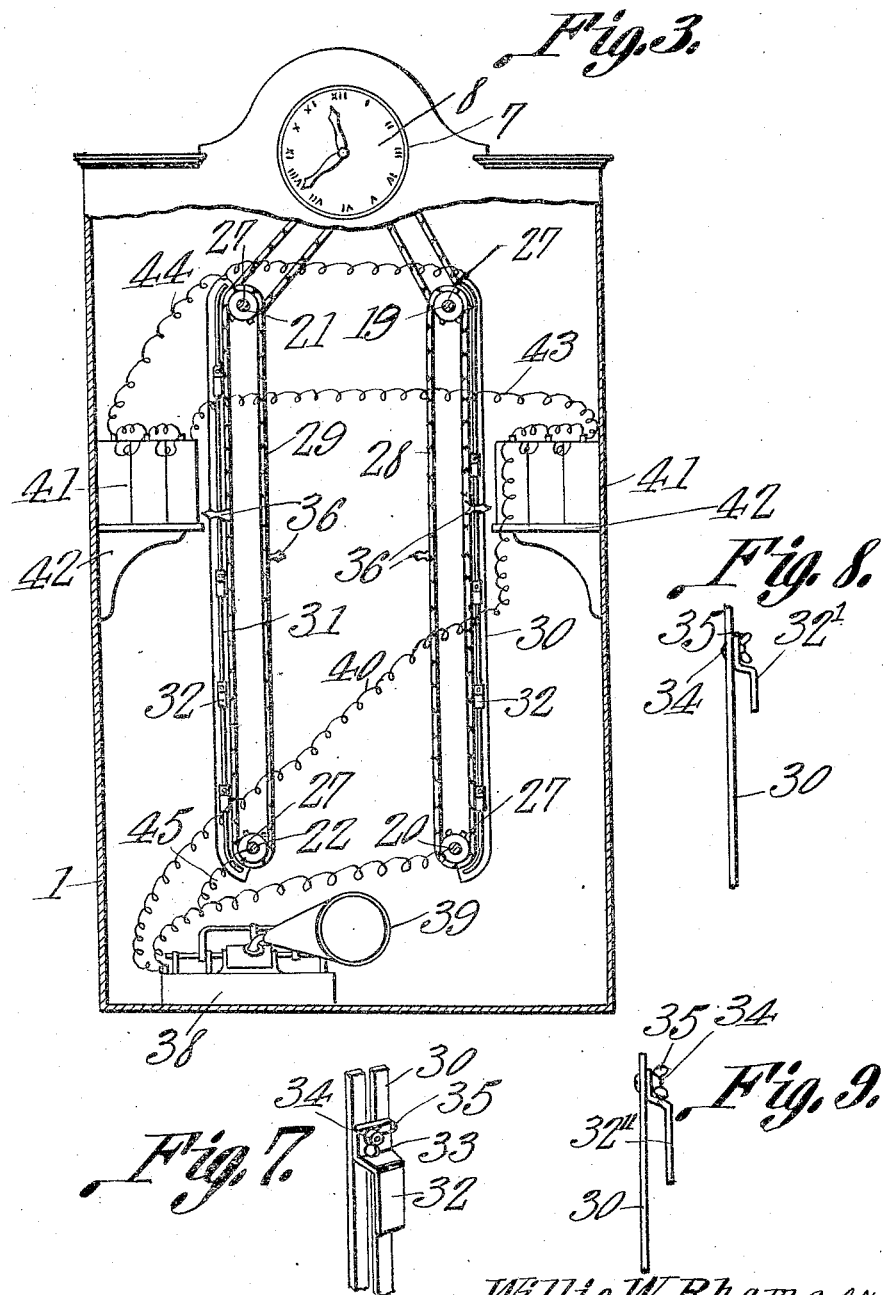

UNITED STATES PATENT OFFICE.

WILLIE W. RHAME, OF SUMMERVILLE, AND SAMUEL H. NUCKOLLS, OF CHARLESTON, SOUTH CAROLINA; SAID NUCKOLLS ASSIGNOR TO SAID RHAME.

INDICATING-CLOCK.

989,290.  Specification of Letters Patent.  Patented Apr. 11, 1911.

Application filed April 25, 1910. Serial No. 557,452.

*To all whom it may concern:*

Be it known that we, WILLIE W. RHAME and SAMUEL H. NUCKOLLS, citizens of the United States, residing, respectively, at Summerville and Charleston, in the counties of Dorchester and Charleston, State of South Carolina, have invented a new and useful Indicating-Clock, of which the following is a specification.

This invention has reference to improvements in indicating clocks and is designed especially, though not necessarily, for use in railway stations for indicating the time of leaving of trains, the indication being under the control of a suitable timepiece, while at proper intervals audible announcements are made by mechanism controlled by the timepiece.

In accordance with the present invention, there are provided lists of the trains, and an index or pointer is caused to move by the timepiece progressively along the list so that an observer may see at a glance the time of departure of any train of the list, while audible announcements are made through the intermediary of a suitable sound reproducing machine controlled by the timepiece and actuated in proper relation to the visual indications.

In accordance with the present invention provision is made for changing the relation of the indicator and sound reproducing machine so that by the use of suitable sound records the audible announcements may be changed from time to time as desired.

The invention will be best understood from a consideration of the following detail description taken in connection with the accompanying drawings forming a part of this specification, in which drawings:—

Figure 1 is a perspective view of an indicator constructed in accordance with the present invention. Fig. 2 is a vertical front to rear section of the indicator structure of Fig. 1. Fig. 3 is a front elevation of the indicator structure with the front of the casing broken away to expose the interior parts, with some of the interior parts shown in section. Fig. 4 is a rear view of the timepiece with parts broken away. Fig. 5 is a rear view of the timepiece and parts driven thereby, the showing being on a somewhat smaller scale than Fig. 4. Fig. 6 is a perspective view of one of the pointers or indices. Fig. 7 is a perspective view of one of the contact members coacting with the pointers. Figs. 8 and 9 are side elevations of different forms of contact members of the kind shown in Fig. 7.

Referring to the drawings there is shown a casing 1 designed to house portions of the operating mechanism of the indicator and this casing is preferably though not necessarily mounted on a pedestal 2 which may be secured at any suitable point on the floor of the station where the indicator is installed.

Of course the indicator structure may be mounted on or in the wall of the station or any portion thereof, but it is usually preferable to support it on a pedestal as shown in Fig. 1. The casing may be made of wood or metal or any suitable material and may be of any ornamental shape. On one face of the casing 1, which is to be considered as the front thereof, there may be mounted a frame 3, of general rectangular shape having a plane surface 4 of suitable character for marking thereon temporary information to be changed from time to time, such information usually relating to the arrival of trains as to whether they are on time or delayed. Of course the surface 4 may be used for any information desired.

In the particular showing of the drawings there is produced on each side of the frame 3, on the front of the casing, lists 5 of the trains, these lists usually relating to the departure of trains, although by no means confined to such information, as any data wherein predetermined times enter as a part of the information to be given may be displayed. The character of the station as to the number of trains departing will determine whether one or more lists will be used.

Exterior to the space utilized for the list or lists there may be provided a space or spaces 6 in which may be displayed suitable advertising matter either confined to railway matters or of a miscellaneous character.

At the top of the casing, or at any other suitable portion there is housed a timepiece 7 of any suitable character with the dial portion 8 visible at the front of the casing in proper relation to the list or lists 5. In the particular structure shown the hour hand arbor 9 of the timepiece is continued to the rear of the timepiece and is there journaled in a bracket 10 carried by the framework or casing of the timepiece, the said bracket also carrying a short shaft 11 on which there is mounted a gear wheel 12 meshing with a gear wheel 13 on the arbor 9. The bracket 10 also carries another short shaft 14 one end of which carries a gear wheel 15 meshing with the gear wheel 12 and the other end of which carries a sprocket wheel 16. The shaft 11 also carries a sprocket pinion 17 similar and adjacent to the sprocket pinion 16, the two pinions 16 and 17 rotating in opposite directions because of the intermeshing of the gears 12 and 15.

In the particular showing of the drawings there are two lists 5 on opposite sides of the frame 3 and this is the reason for providing two sprocket pinions 16 and 17, and if more than two lists be used additional pinions may be employed or other means may be used in connection with the additional lists for a purpose which will hereinafter appear.

The frame 3 is connected at the top and bottom with the front of the casing by short outstanding webs 18 so that the sides of the frame are spaced a short distance from the front of the casing 1.

Extending through the front of the casing near the upper and lower ends of the frame 3 are shafts 19, 20, 21, 22, the shaft 20 being underneath the shaft 19 and the shaft 22 being underneath the shaft 21. On each shaft 19 and 21 is a respective sprocket pinion 23, 24, the pinions 16 and 23 being connected by a sprocket chain 25 and the pinions 17 and 24 being connected by a sprocket chain 26. The several shafts 19, 20, 21, and 22 extend through the front of the casing and there each shaft carries a pinion 27, the pinions 27 of the shafts 19 and 20 being connected together by a sprocket chain 28 and the pinions 27 of the shafts 21 and 22 being connected together by a similar sprocket chain 29. When the clock or timepiece is in motion then the arbor 9 will rotate and this will impart movement through the pinions 13, 12 and 15 to the shafts 11 and 14 and from these shafts motion is transmitted by the sprocket pinions 16 and 17 and chains 25 and 26 to the shafts 19 and 21 and these latter transmit motion to the sprocket chains 28 and 29 by the pinions 27, the shafts 20 and 22 acting simply as idler shafts for maintaining the chains 28 and 29 in a suitably taut condition.

Close to the outer run of the sprocket chains 28 and 29 are longitudinally slotted bars or guide strips 30, 31 respectively, each of which carries a contact plate 32 having one end bent at an angle as shown at 33 and there traversed by a bolt 34 provided with a wing nut 35 for ready manipulation. The other end of the plate 32 is free and may therefore possess limited elasticity.

Fast to each chain 28, 29 are two pointers 36 so located that one of these pointers at a time will traverse the face 5 adjacent to the corresponding edge of the frame 3. Of course one pointer only may be used or more than two pointers may be used, but the preferable arrangement is that but one pointer at a time shall be visible over one of the lists but the pointers may be visible on both lists at one time. In the particular arrangement of the parts shown four index fingers or pointers 36 are illustrated, two for each list 5 and these pointers are to be understood in operation as moving downward. Each pointer 36 carries a contact terminal in the form of a strip 37 constituting a contact brush designed to move over the contact plates 32 in electrical engagement therewith.

Within the casing and preferably though not necessarily in the lower portion thereof there is installed a sound reproducing machine 38 to a large extent diagrammatically represented. This sound reproducing machine may be of any of the well known types of the self restoring character so that when the record has been traversed by the reproducing stylus the sound box will be returned to the initial position, and is equipped with the usual amplifying horn 39.

The contact plates 32, because of the wing nuts 35 and the slotted strips 30 or 31, are readily located in the path of the respective pointers 36 so as to be engaged by the brush 37 carried by each pointer 36, in any desired relation to the lists 5.

It will be observed that the plates 32 may be long or short in accordance with the desired extent of matter to be reproduced by the sound reproducing machine. In Fig. 8 a short strip 32' is indicated and in Fig. 9 a long strip 32'' is indicated, and longer or shorter strips may be used as desired.

Let it be assumed that the lists 5 each contain a column designating the trains and the time of departure therefor, and the timepiece 7 is operating and that the chains 28 and 29 are moving in accordance with the timepiece. The pointers 36 will therefore be moving down the lists 5 and will move into indicating relation to and then past the several indications on the lists and an observer by looking at the particular list desired will find when the next train is to depart by the position of the respective pointer 36 with relation to the list. The pointer 36 is assumed to travel over the list in accordance with the time indications of the timepiece so that by consulting the latter the observer may ascertain how much time will elapse before the desired train will depart.

It is often desirable that some special announcement be made with respect to certain trains, and in order that this may be done at the proper time the plates 32 are arranged along the strips 30 in proper relation to the times for the departure of the trains so that the pointer 36 will move over these strips and the brush 37 carried by the pointer will make electrical contact with the strips 32 in succession.

The sound reproducing machine 38 is assumed to be electrically driven as is customary and one side of the motor is connected by a conductor 40 to a battery 41 within the casing 1, this battery being shown as mounted on suitable shelves 42 on opposite sides of the casing, with the cells of the battery connected together by a conductor 43 while the other side of the battery is connected by a conductor 44 to both strips 30 and 31. The other side of the motor of the sound reproducing machine 38 may be connected by a conductor 45 to both shafts 20 and 22 so that current will traverse the shafts and reach the chains 28 and 29 and from the latter pass to the pointers 36. Consequently whenever a brush 37 comes in contact with a plate 30 there is established a circuit from the battery 41 by way of the conductor 44 to the respective strips 30 or 31 as the case may be, thence by way of the particular plate 32 engaged by the brush 37, thence to the chain 28 or 29 as the case may be and to the shaft 20 or 22, thence by way of the conductor 45 to the motor of the sound reproducing machine 38, and finally returning to the battery by the conductor 40. So long as the circuit is completed in the manner set forth the sound reproducing machine 38 will operate and an announcement will be heard issuing from the amplifier 39 and this announcement may be sufficiently loud to be clearly audible throughout the area desired. As soon as the brush 36 moves from the plate 32 with which it was in engagement the operation of the sound reproducing machine will cease.

By suitably providing the sound records and adjusting the plates 32 with reference to the lists 5 any audible announcement desired may be had in conjunction with any train and in proper timed relation to the time of departure of such trains. Furthermore any announcement desired whether relating to trains or not may be caused to issue from the mouth of the amplifier 39.

It will be understood of course that the lists 5 as well as the advertisements within the spaces 6 may be made removable so as to admit of change from time to time as may be necessary or desirable.

While the drawings illustrate a practical form of the invention, it will be understood that the invention may be embodied in other constructions and is therefore not limited to the form shown, but any changes in construction and arrangements of the parts may be made so long as the salient features of the invention are retained.

What is claimed is:—

1. An indicator comprising a time piece, constantly visible indices other than the indicating hands of said time piece, endless carriers actuated by the time piece and to which the indices are directly secured, a sound reproducing machine, and means actuated by the carriers for causing the operation of the sound reproducing machine in predetermined relation to the movable indices.

2. An indicator comprising a time piece, constantly visible indices other than the time indicating hands of said time piece, endless carriers actuated by the time piece and to which the indices are directly connected, a sound reproducing machine, and means for causing the operation of the sound reproducing machine in predetermined relation to the movable indices, comprising contacts carried by the movable indices, adjustable contacts in the path of the first named contacts, and an electric circuit including the contacts and the sound reproducing machine and adapted to have a source of electric energy included therein.

3. An indicator comprising a clock, an endless carrier driven thereby, indices directly connected with the carrier, means coöperating with the indices for imparting information visually, means for imparting information audibly, and means adjustable at will into coöperative relation to the indices on the carrier for causing the actuation of the audible means to produce long or short announcements.

4. An indicator comprising a clock, an endless carrier driven thereby, indices directly connected with the carrier, means coöperating with the indices for imparting information visually, an electrically actuated sound reproducing machine, and electric contacts controlled by the carrier for causing the actuation of the sound reproducing machine at predetermined times.

5. An indicator comprising a clock, an endless carrier driven thereby, indices on the carrier, means coöperating with the indices for imparting information visually, a conducting strip or support in operative relation to one run of the carrier, contacts on and adjustable along said strip or support, a contact carried by each index on the carrier, and an electrically actuated sound reproducing machine controlled by the said contacts on the contact support and on the carrier.

6. An indicator comprising a suitable casing, a clock therein, an endless carrier driven by the clock within the casing, indices on the carrier extending to the exterior of the casing, means on the exterior of the casing coöperating with the indices for imparting information visually, an electrically driven sound reproducing machine within the casing, electric contacts in operative relation to the carrier, and other electric contacts carried by the carrier and coöperating with the first named contacts to cause the actuation of the sound reproducing machine at predetermined times.

7. An indicator comprising a suitable casing having means on its exterior for imparting information visually, means also on the casing for the display of temporary information, a time piece carried by the casing, indices actuated by the timepiece and movable in operative relation to the means for imparting information visually, a sound reproducing machine in the casing, and means coöperating with the clock driven indicating means for causing the actuation of the sound reproducing machine at predetermined times.

In testimony that we claim the foregoing as our own, we have hereto affixed our signatures in the presence of two witnesses.

WILLIE W. RHAME.
SAMUEL H. NUCKOLLS.

Witnesses:
FRANK B. OCHSENREITER,
C. E. PREINKERT.

---

Copies of this patent may be obtained for five cents each, by addressing the "Commissioner of Patents, Washington, D. C."